(12) United States Patent
Haas et al.

(10) Patent No.: US 11,906,485 B2
(45) Date of Patent: Feb. 20, 2024

(54) INDENTER RECEPTACLE FOR A MEASURING DEVICE, AND A MEASURING DEVICE FOR DETECTING SIGNALS

(71) Applicant: Helmut Fischer GmbH Institut für Elektronik und Messtechnik, Sindelfingen (DE)

(72) Inventors: Tanja Haas, Calw (DE); Henry Thiele, Doeffingen Grafenau (DE); Josef Ludwig, Northeim (DE)

(73) Assignee: Helmut Fischer GmbH Institut für Elektronik und Messtechnik, Sindelfingen (DE)

( * ) Notice: Subject to any disclaimer, the term of this patent is extended or adjusted under 35 U.S.C. 154(b) by 97 days.

(21) Appl. No.: 17/546,615

(22) Filed: Dec. 9, 2021

(65) Prior Publication Data
US 2022/0196529 A1 Jun. 23, 2022

(30) Foreign Application Priority Data
Dec. 21, 2020 (DE) .......................... 102020134454.6

(51) Int. Cl.
*G01N 3/42* (2006.01)
(52) U.S. Cl.
CPC ...................................... *G01N 3/42* (2013.01)

(58) Field of Classification Search
CPC .... G01N 3/42; G01N 2203/0676; G01N 3/46; G01N 3/40; G01N 2203/0078
See application file for complete search history.

(56) References Cited

U.S. PATENT DOCUMENTS

| 6,520,004 | B1 * | 2/2003 | Lin | G01N 3/46 73/81 |
| 8,789,430 | B2 * | 7/2014 | Nevshupa | G01L 5/166 73/862.541 |
| 11,435,270 | B2 * | 9/2022 | Mayer | H01R 13/2478 |
| 2009/0107221 | A1 * | 4/2009 | Ernst | G01N 3/42 73/81 |
| 2012/0279321 | A1 * | 11/2012 | Nevshupa | G01L 5/0038 73/862.541 |

FOREIGN PATENT DOCUMENTS

| DE | 69917780 T2 | 6/2005 |
| DE | 102016123010 A1 | 5/2018 |

* cited by examiner

*Primary Examiner* — Freddie Kirkland, III
(74) *Attorney, Agent, or Firm* — Renner, Otto, Boisselle & Sklar, LLP

(57) ABSTRACT

The invention relates to an indenter receptacle for a measuring device, having a receptacle for detachably fastening an indenter, having an interface for mounting a measuring device, wherein a solid body joint arrangement is provided, which at least three solid body joints are provided between the interface and the receptacle and which are aligned offset at 90° to one another with respect to their flexibility in only one spatial direction.

21 Claims, 10 Drawing Sheets

Figure 1:
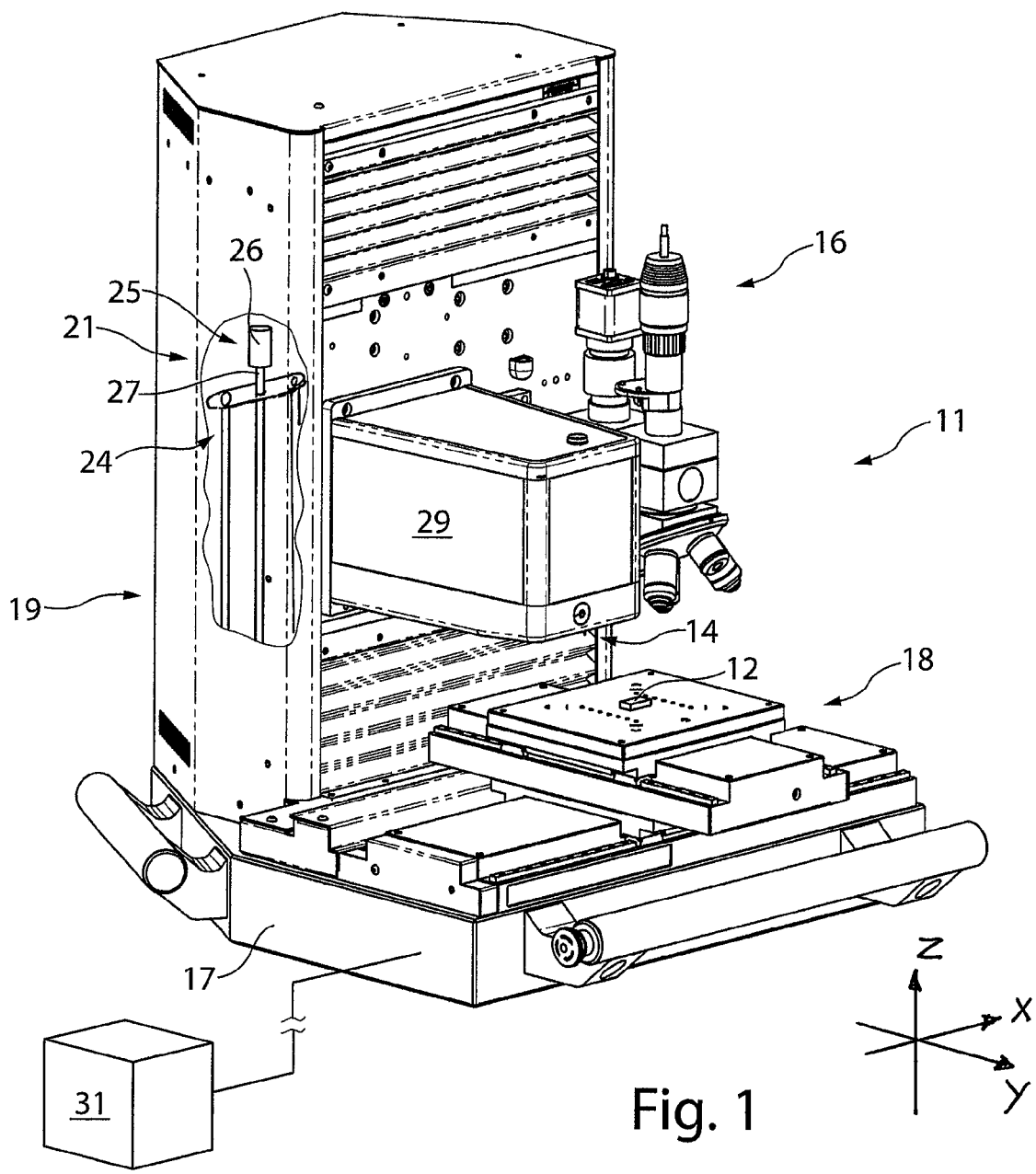

INDENTER RECEPTACLE FOR A MEASURING DEVICE, AND A MEASURING DEVICE FOR DETECTING SIGNALS

This application claims priority to German Application No. 10 2020 134 454.6 filed Dec. 21, 2020, the entire disclosure of which is hereby incorporated herein by reference in its entirety.

The invention relates to an indenter receptacle for a measuring device and a measuring device for detecting measurement signals during a penetration movement of an indenter into a surface of a test specimen or in a coating on the test specimen for detecting the adhesive strength of the layer on the test specimen or for detecting measurement signals during a scanning movement of the indenter on the surface or layer of the test specimen.

A measuring device for measuring the scratch resistance of a film or coating is known from DE 699 17 780 T2. This measuring device comprises a stand on which an indenter guide having an indenter that can be attached thereto is provided. Furthermore, a drive is provided to move the indenter towards a test specimen along a Z-axis. This indenter drive comprises two L-shaped legs which are directed towards each other and between which a moveable carrier is mounted. This moveable carrier is held moveably in relation to the L-shaped legs by a pair of diaphragm springs in each case. Two L-shaped legs are provided in turn on the support, which in turn receives an indenter holder, which is supported by a pair of diaphragm springs in relation to each of the L-shaped legs. This arrangement is elastic perpendicular to a plane of the diaphragm springs arranged and aligned relative to one another in pairs, and is rigid in further spatial directions. The indenter holder thus has a single degree of freedom along the Z-axis, in which the indenter is moved perpendicular to the surface of the test specimen towards the test specimen.

The requirements for such measuring devices, which are used both for detecting measurement signals during a penetration movement of an indenter into a surface of the test specimen, in particular for determining the scratch resistance of the surface of the tester, or for detecting measurement signals during a scanning movement of the indenter on the surface of the test specimen, are constantly increasing.

The object of the invention is to propose an indenter receptacle for a measuring device as well as a measuring device which can be used for the various measuring tasks, in particular which has improved measuring accuracy and increased sensitivity for detecting measurement signals.

This object is solved by an indenter receptacle which comprises a solid body arrangement which comprises at least two solid body joints between an interface for mounting the solid body joint arrangement on a measurement device and a receptacle for detachably fastening the indenter, wherein the first and at least one further solid body joint are aligned offset from one another by 90° with respect to their flexibility in only one spatial direction. This enables measurement signals to be recorded during the deflection of the indenter in at least two spatial directions, whereby increased sensitivity is provided. The evaluation of at least two measurement signals from the at least two different special directions enables increased sensitivity and thus an increase in the quality of the evaluation of the measurement signals.

Advantageously, it is provided that the solid body arrangement of the indenter receptacle has a first solid body joint which is flexible along a vertical axis, i.e. Z-axis, and is mechanically rigid in the other spatial directions, i.e. an X- and Y-axis, and the second solid body joint, which is preferably connected downstream of the first solid body joint, is flexible in the X- or Y-axis and is mechanically rigid in the other Y- or X-axis and in the Z-axis. Thus, in addition to the traversing movement of indenter along the Z-axis in another spatial direction, measurement signals can be obtained for the evaluation.

Preferably, it is provided that the solid body arrangement of the indenter receptacle comprises a first solid body joint, a second and a third solid body joint.

The third solid body joint is provided between the second solid body joint and the receptacle of the indenter. This third solid joint is flexible in the X- or Y-axis, wherein the second solid body joint is mechanically rigid in the X- or Y-axis. The second and third solid body element is mechanically rigid in the Z-axis. This enables three solid body joints to be arranged in a row to form a solid body joint arrangement, whereby one solid body joint in each case is designed to be flexible in only one spatial direction and mechanically rigid in the other two spatial directions. Thus, with such a solid body arrangement, on the one hand, an indentation path in the Z-axis can be enabled, as well as a deflection movement aligned laterally thereto in the X-direction and Y-direction.

Advantageously, the solid body joints of the solid body arrangement are aligned such that the first solid body joint, which comprises the interface for mounting on the measurement device, is flexible in the Z-axis and mechanically rigid in the X- and Y-axes, and that the third solid body joint is flexible in the X-axis and mechanically rigid in the Y- and Z-axes. This sequence of the solid body joints is particularly advantageous for the detection and evaluation of the measurement signals. The sequence for the X- and Y-axes can also be reversed.

The first solid body joint of the indenter receptacle is preferably formed as a peripheral, preferably rectangular, frame, which comprises a front and rear end face, between which two legs extend, which are spaced apart from each other and, in particular in parallel to each other, wherein each leg is connected with at least one joint to the front and rear end face. This joint can be formed by a reduction in cross-section compared to the wall thickness of the leg. This closed frame makes it possible to have a defined force generation for a predefined travel distance. By designing the cross-section reduction or the thinnest wall thickness of the joints and the modulus of elasticity of the material for the frame, a defined force can be assigned to a defined travel distance. By way of example, a travel distance of 1 mm can correspond to a force of 30 N and a travel distance of 2 mm can correspond to a force of 60 N. Ranges can also be selected in which the travel distance of one millimetre corresponds to 50 N or 100 N. This can also enable an easy adaptation to specific measuring tasks.

Advantageously, the cross-sectional reductions on the joint are formed on the respective inner side and/or outer side of the legs and preferably facing each other on the frame.

In the first solid body joint, the front end face is preferably aligned parallel to the rear end face, whereby the front end face can be moved along the Z-axis and a parallelogram guide for the front end face is provided by the legs. In this way, exact guidance of the indenter can be achieved during a traversing movement along the Z-axis.

In the first solid body joint, the peripheral frame on the inner side or outer side, in particular on the inner side or outer side of the legs, can preferably be flat. In this way, a simple constructive structure can be achieved.

On the front end face, the at least one receptacle for the indenter is preferably arranged with the interposition of the at least one further solid body joint. In this way, a compact structure can be achieved.

Furthermore, it is preferably provided that a projection is provided on the front end face of the first solid body joint, on the underside of which the second solid body joint is arranged. As an alternative to this projection, retaining webs, protrusions or similar can also be formed.

In the solid body arrangement of the indenter receptacle, it is preferably provided that the second and third solid body joint is formed by two webs with cross-sectional tapers, which are aligned offset by 90° to each other and are preferably formed by two curved semi-circular recesses arranged mirror-inverted to each other. This enables the flexibility in and against the mechanically flexible [lacuna] to be the same in both directions.

Furthermore, it is preferably provided that a longitudinal axis of the indenter positioned in the receptacle lies at the intersection of the second and third solid body joint. This enables the indenter to be received centrally with respect to the second and third solid body joint.

Furthermore, it is preferably provided that the second and third solid body joint, which are preferably arranged one above the other in the Z-axis, have a bore at the point of intersection which is aligned with the receptacle and which is preferably provided to be larger than the bore of the receptacles. This enables the central arrangement of the indenter as well as sufficient clearance for the deflection of the indenter into the mechanically flexible space of the at least two solid body joints.

Furthermore, it is preferably provided that the first solid body joint is formed in one piece, or that the first and second or the second and third solid body joints are formed in one piece, or that the first, second and third solid body joints are formed in one piece. In this way, gap suspension can be ruled out. The solid body joints can operate reliably in a linear manner.

Advantageously, this solid body arrangement comprises a first measuring device which is provided on an outer side of the front end face of the frame. This measuring device comprises at least one proximity sensor, a distance measuring device or similar, whereby a deflection movement of the first solid body joint along the Z-axis can be detected.

Furthermore, it can preferably be provided that one or more, preferably two, sensors aligned at an angle to one another are positioned adjacent to the projection, by means of which sensors a traversing movement along the Z-axis can be detected. This or these two sensors aligned at an angle to each other are fixed to a measuring head housing of the indenter receptacle or a separate holder inside the measuring head housing and can detect the relative movement of the first solid body joint. Due to the angular arrangement of the sensors, an improved evaluation to their measuring surface can be possible with a small traversing movement.

The receptacle of the indenter preferably comprises a support frame, which is preferably closed, or a support structure, such as a linkage, a cantilever or open frame. The support frame or support structure preferably engage with the lower end of the second or third solid body joint and surround or pass by the cantilever. At least one measuring surface is preferably provided at the upper end of the support frame or support structure, on which at least one sensor of a second measuring device aligned in the Y-direction and at least one sensor aligned in the X-direction for forming a third measuring device are provided. According to a first embodiment, the measuring surface can, for example, be a ferrite disc in order to carry out a distance measurement with a probe that is operated according to the magnetic inductive measuring method. Alternatively, instead of the ferrite disc and the magneto-inductive measuring probe, a measuring probe operated according to the eddy current method can also be used. Furthermore, a proximity sensor or similar can be provided, which detects a change in the distance from the measuring surface to the sensor. This arrangement has the advantage that the second and/or third measuring device are provided directly on the solid body arrangement, in particular the first solid body joint, whereby a high level of precision in the detection of the measurement signals can be achieved.

According to an alternative embodiment of the indenter receptacle, it is provided that the first solid body joint and the at least one further solid body joint are integrated in a solid body arrangement. In particular, the first solid body joint and the at least one further solid body joint form a common frame. This frame has a rear end face and a front end face, between which legs are provided at a distance from one another, preferably in parallel, wherein each leg is connected to the front end face by at least two joints and to the rear end face by at least two joints. A recess is preferably provided between the two joints. Such an integrated arrangement makes it possible to detect a change in the position of the indenter along the Z-axis, the Y-axis and/or the X-axis.

According to the above alternative embodiment of the solid body arrangement, it is provided that the joints are formed by separate joint elements which can be connected by a detachable connection with the respective leg to the front and rear end face. In this way, a cost-reduced construction of the first solid body joint can be achieved. Directly applied sensors can be provided on the joint elements.

Alternatively, it can be provided that a directly applied sensor, in particular a strain gauge or a piezo element, is provided on an outer side of the at least one joint. These sensors can, for example, be designed as triaxial sensors. Two or more sensors can also be provided for each joint. Likewise, no sensors can be provided at individual joints and one or more sensors can be provided at other joints. By way of example, four joints can be provided with one or more, preferably two, sensors.

The object of the invention is further solved by a measuring device for detecting measurement signals during a penetration movement of an indenter into a surface of a test specimen or into a coating on the test specimen, in particular for determining the adhesive strength of the coating on the test specimen or for detecting measurement signals during a scanning movement of the indenter on the surface or the coating of the test specimen, in particular for determining surface topology, which comprises an indenter receptacle according to one of the above embodiments for receiving the indenter. In this way, the sensitivity of the measuring device can be increased, and an improved determination and evaluation of measurement signals can be enabled.

Preferably, it is provided that a measuring table is provided on a base, and adjacent to the measuring table on the base, a stand is received which extends along a Z-axis, to which the indenter receptacle is preferably detachably attached. This detachable attachment enables the indenter receptacle to be interchangeably arranged with different first solid body joints in a simple manner on a base module of the measuring device, which comprises the measuring table, the base, and the stand. This is particularly advantageous when different force ranges are provided for a predetermined traversing movement along the Z-axis.

It is preferably provided that a first measuring device for detecting a traversing movement along the Z-axis is provided by a lifting drive device for controlling the indenter receptacle along the Z-axis. In this way, the control of the Z-axis can be made possible at the same time for the detection of a penetration movement of the indenter or a traversing movement along the Z-axis.

Figure 2:
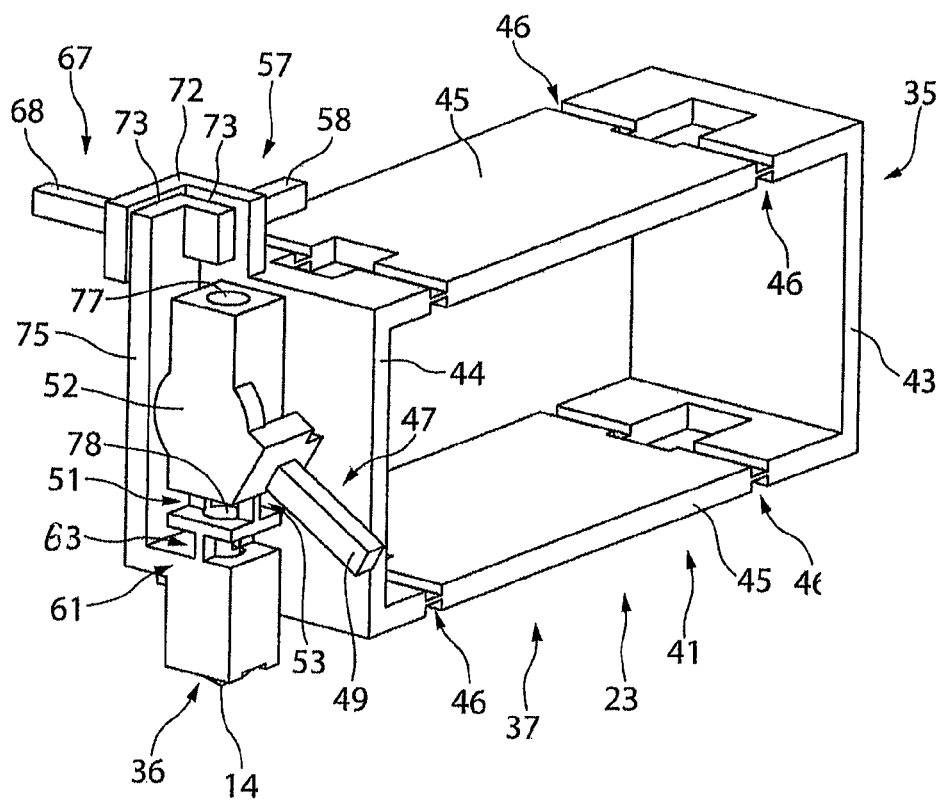
Figure 3:
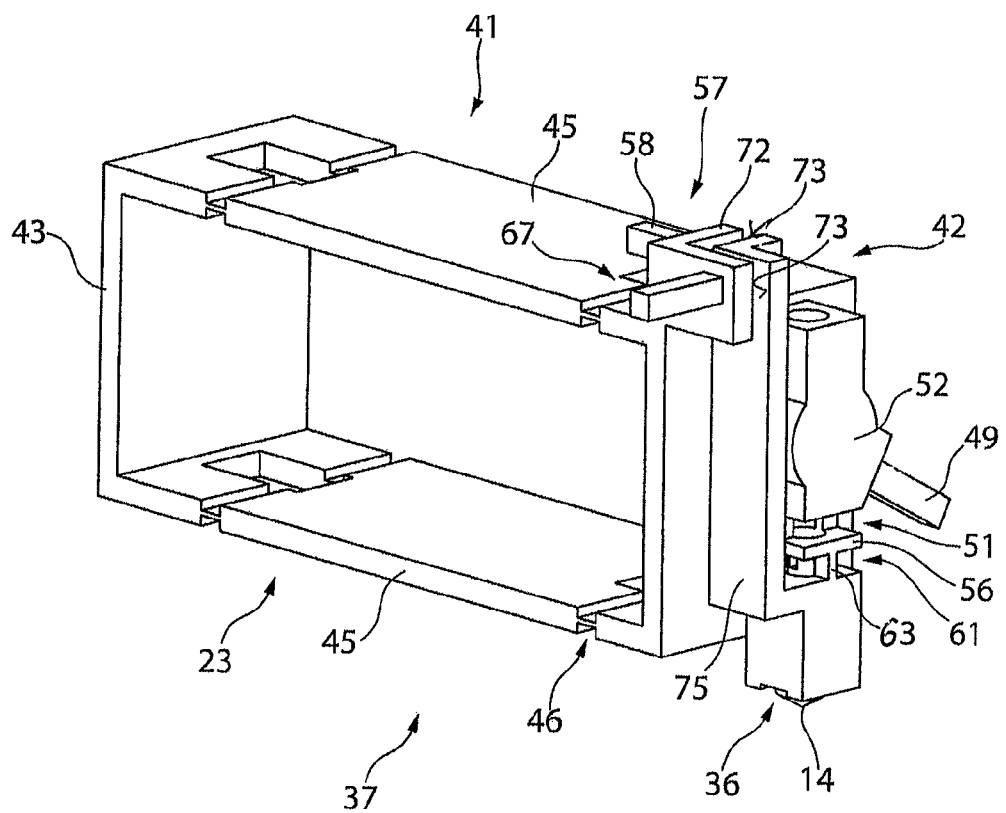
Figure 4:
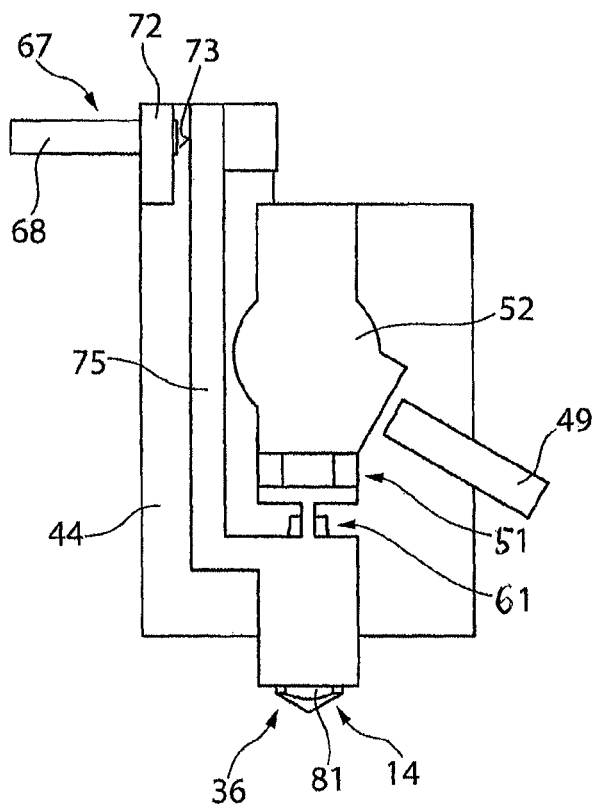
Figure 5:
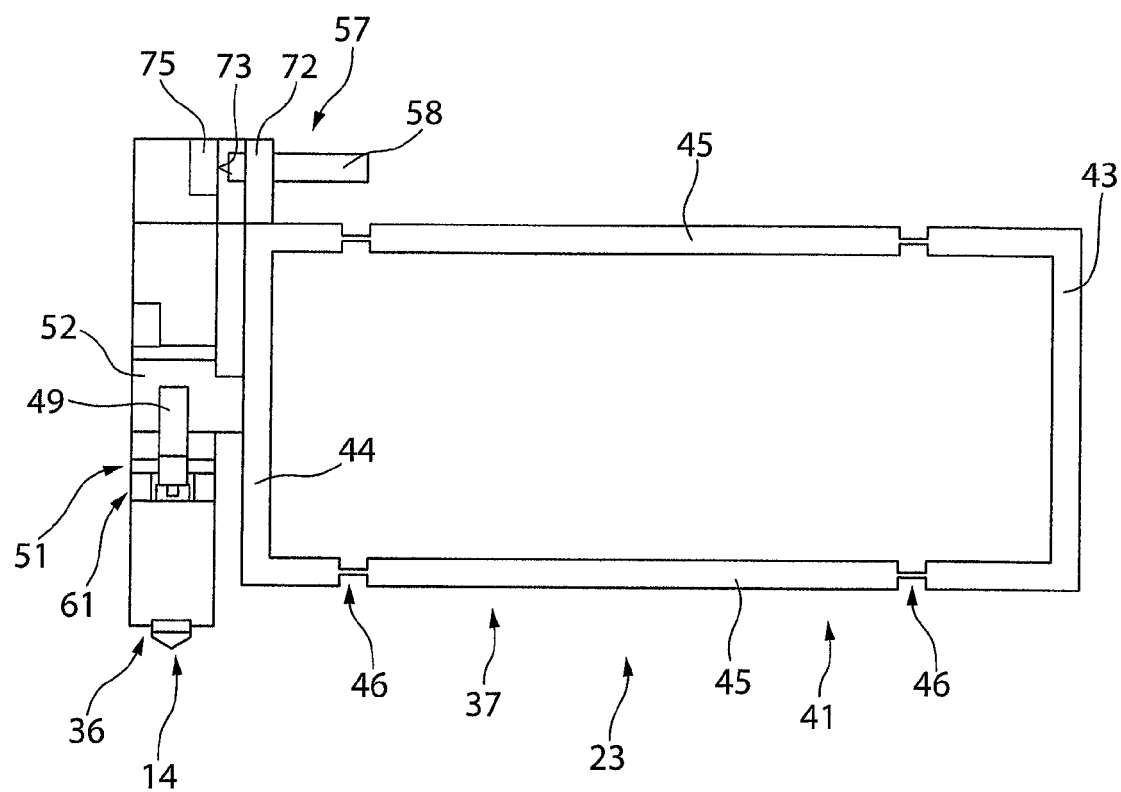
Figure 6:
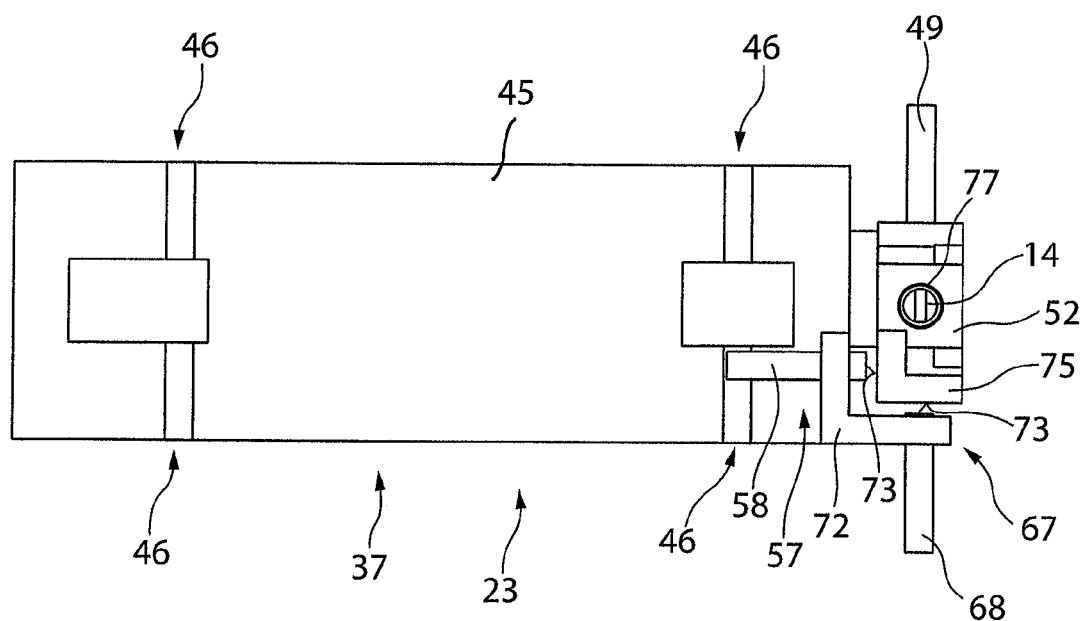
Figure 7:
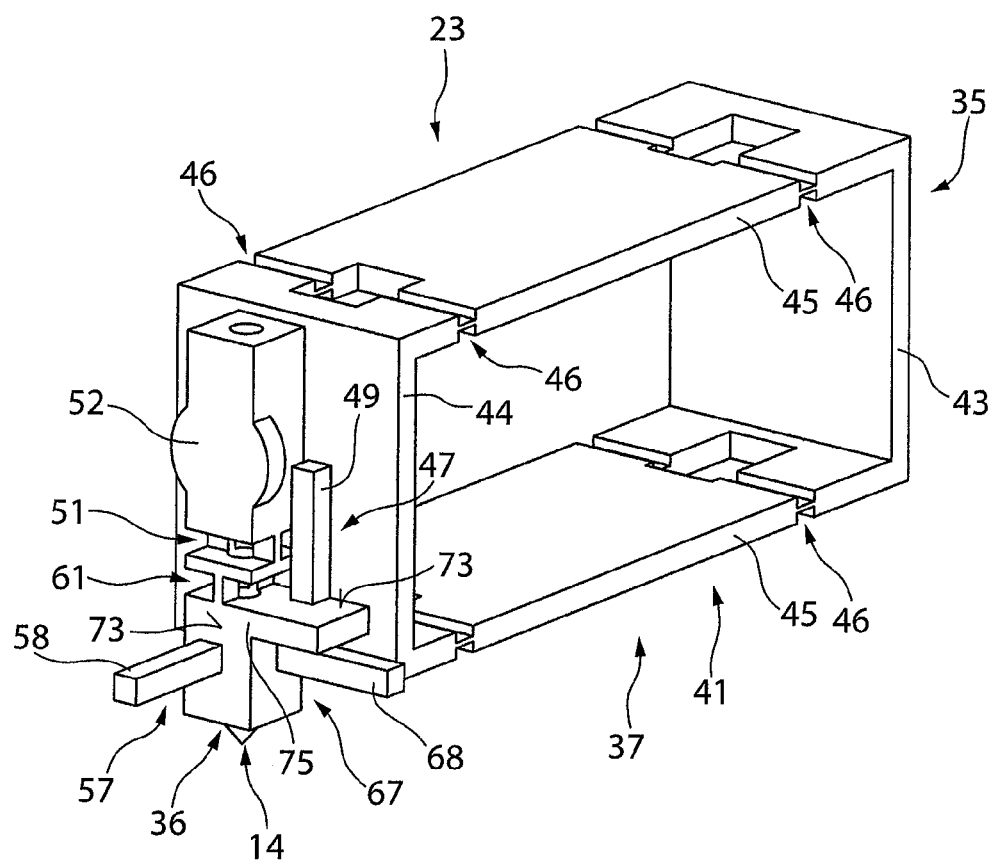
Figure 8:
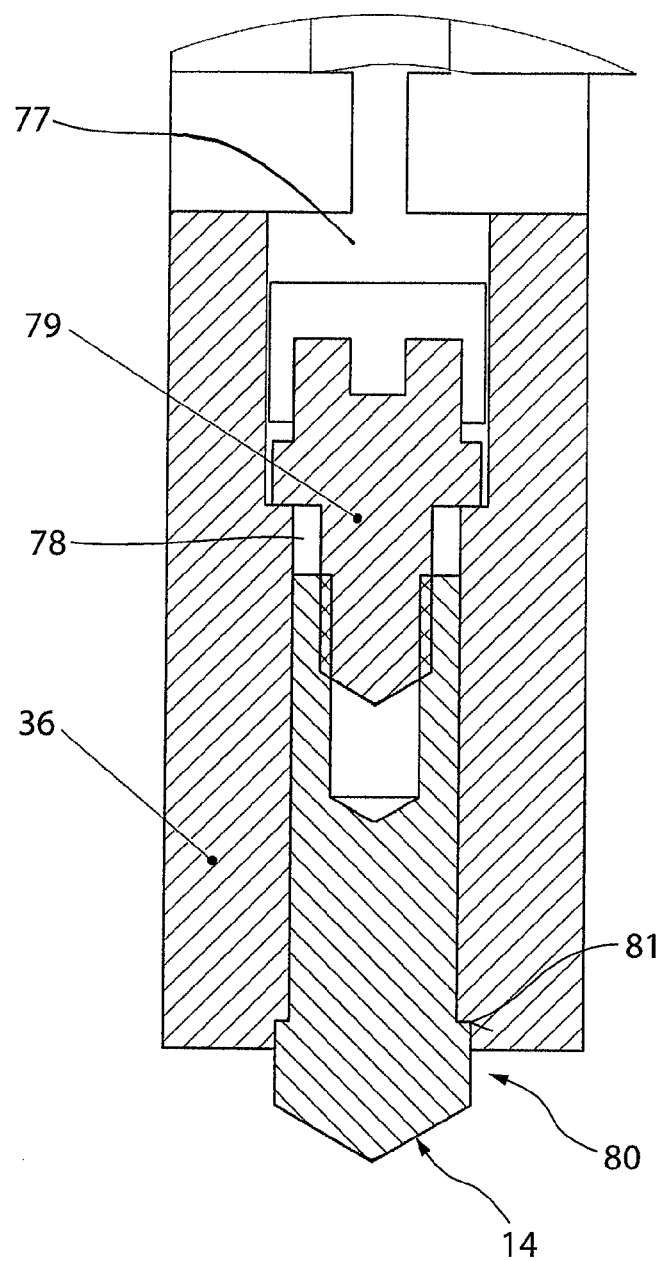
Figure 9:
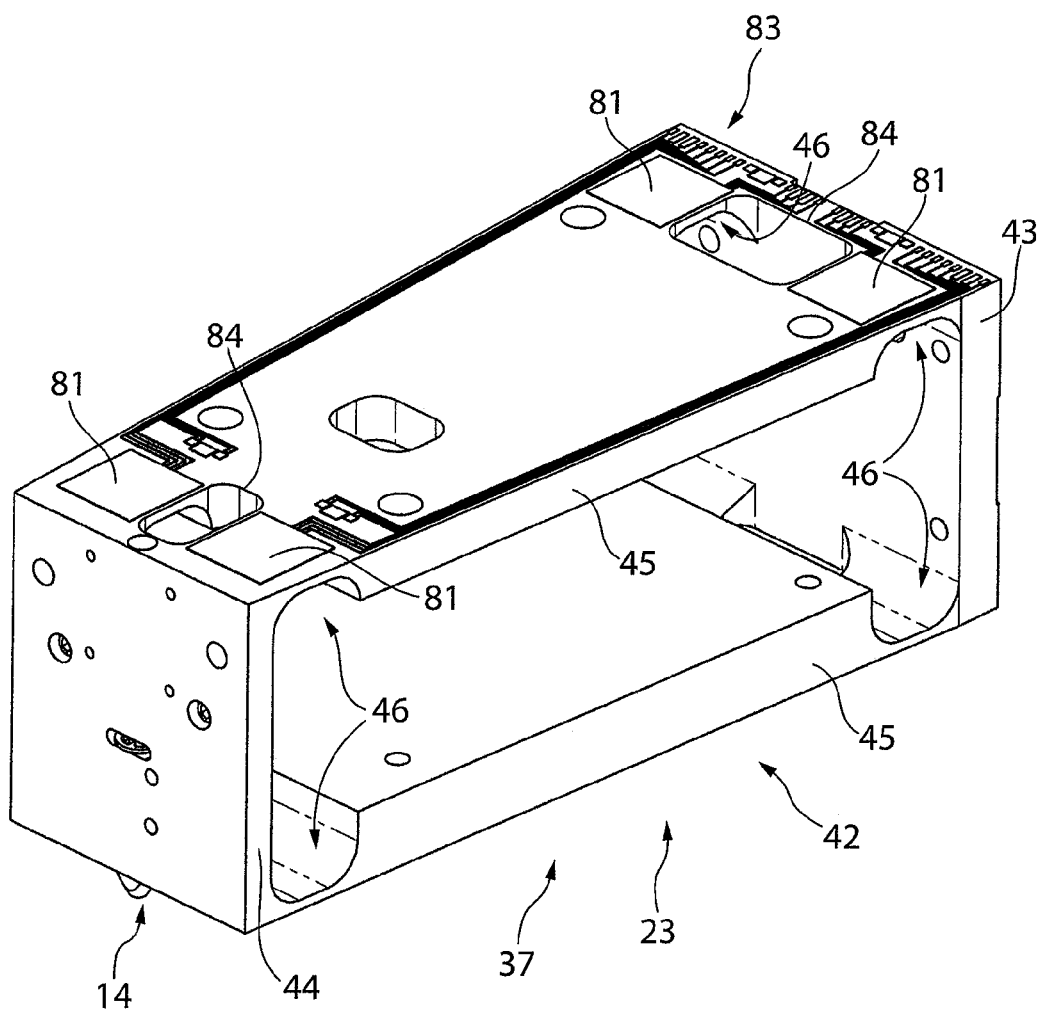
Figure 10:
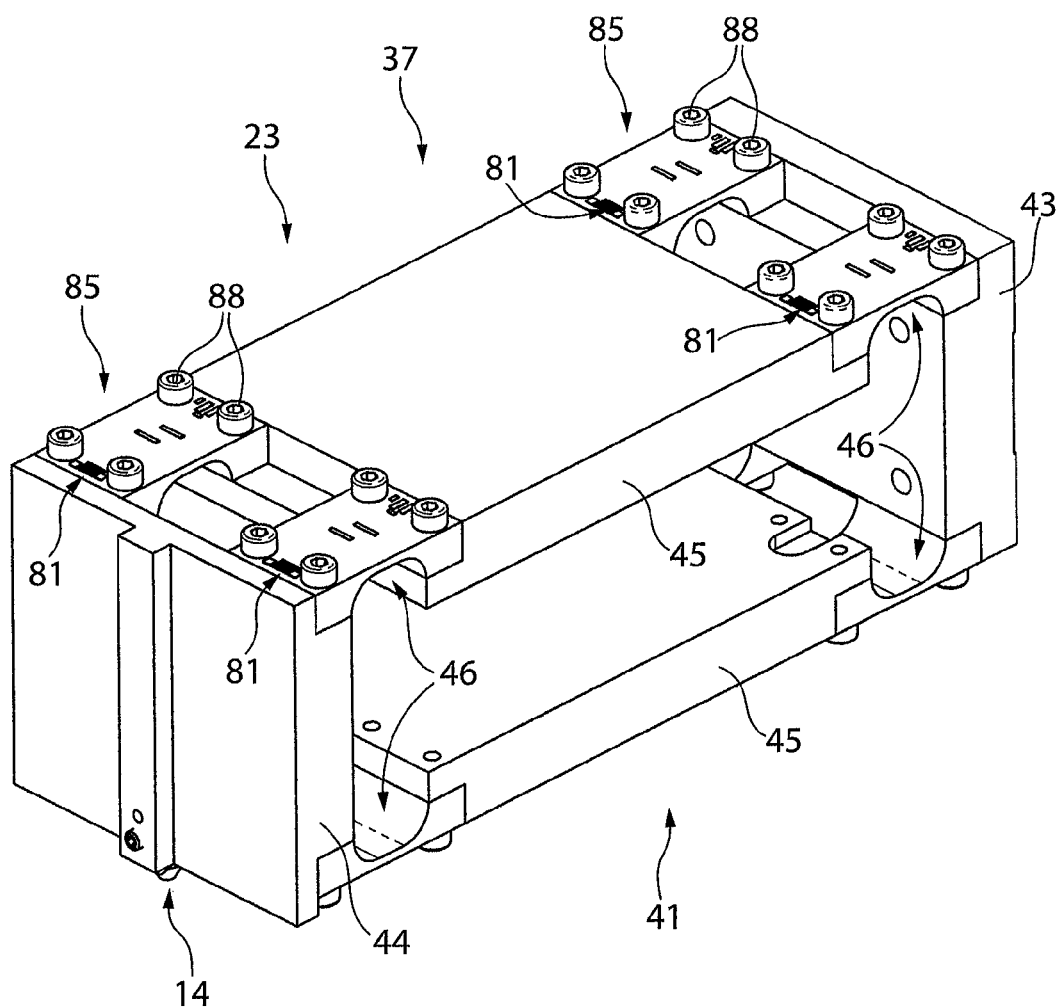

The invention and other advantageous embodiments and developments thereof are described and explained in more detail below with reference to the examples depicted in the drawings. The features to be taken from the description and the drawings can be used individually or in any combination in accordance with the invention. Here are shown:

FIG. 1 a perspective view of a measuring device,

FIG. 2 a perspective view of an indenter receptacle,

FIG. 3 a further perspective view of the indenter receptacle according to FIG. 2, FIG. 4 a front view of the indenter receptacle according to FIG. 2, FIG. 5 a side view of the indenter receptacle according to FIG. 2, FIG. 6 a top view of the indenter receptacle according to FIG. 2, FIG. 7 a perspective view of an alternative embodiment of the indenter receptacle to FIG. 2, FIG. 8 a schematic sectional view of the receptacle for the indenter, FIG. 9 a perspective view of an alternative embodiment of the indenter receptacle according to FIG. 2, and FIG. 10 a perspective view of an alternative embodiment of the indenter receptacle to FIG. 9.

A measuring device 11 is depicted in perspective in FIG. 1. Such a measuring device 11 can be provided for testing mechanical and/or physical properties of surfaces of the test specimens 12 or of the at least one coating on the test specimen 12, such as films, vapour depositions and/or lacquers. Furthermore, this measuring device 11 can be provided for determining an adhesive strength of a film, a layer or a coating on objects. By way of example, CVD or PVD coatings can be tested with regard to their adhesive strength. Likewise, further micro-scratches can be detected or other deformation information from the surface of the test specimen 12 or the coating on the test specimen 12 can be detected and analysed. This measuring device can also be used to determine the topology of a surface of the test specimen 12 or a layer on the test specimen 12. In this case, the indenter 14 is placed on the surface or coating of the test specimen 12 and moved along the surface to scan the roughness of the surface or the coating of the test specimen 12.

This measuring device 11 further comprises an optical device 16 which comprises a microscope and/or a camera. By means of this optical device 16, information from a penetration point of the indenter 14 into the surface of the test specimen 12 or into the coating of the test specimen 12 can be recorded. Micro-scratches, for example, can also be electronically evaluated with respect their contour.

This measuring device 11 comprises a base 17. The base 17 accommodates a measuring table 18, which is preferably designed as a cross table. This measuring table 18 is moveable in an X/Y plane, wherein the measuring table 18 is moveable along a long axis in the X-direction and along a short axis in the Y-direction. A stand 19 is provided on the base 17. A lifting drive device 21 is provided in this stand 19, by means of which an indenter receptacle 23 (FIG. 2) can be moved along the Z-axis relative to the measuring table 18. This indenter receptacle 23 receives the indenter 14. Adjacent to the indenter receptacle 23, the optical device 16 is provided, which can also be moved relative to the measuring table 18 along the Z axis, preferably separately from the indenter receptacle 23. The lift drive device 21 comprises a column guide 24 and preferably a spindle drive 25, wherein a motor 26 drives a spindle 27 of the spindle drive 25 in order to control a traversing movement along the Z axis for the indenter receptacle 23. The motor 26 is preferably designed as a high-resolution motor, such that a control in very fine steps is possible in order to precisely control a travel path of the indenter receptacle 23 along the Z-axis.

The indenter receptacle 23 is surrounded by a removable measuring head housing 29.

This measuring device 11 is controllable by a control device comprising a data processing device 31, which is depicted schematically. This data processing device 31 can comprise a display, an input keyboard and further connections, such as a storage medium or an interface for data transmission, for example.

A first perspective view of the indenter receptacle 23 is depicted in FIG. 2. FIG. 3 shows a further perspective view of the indenter receptacle 23 according to FIG. 2. FIG. 4 shows a front view. A side view of the indenter receptacle 23 is depicted in FIG. 5. A plan view of the indenter receptacle 23 is shown in FIG. 6.

This indenter receptacle 23 comprises an interface 35, through which this indenter receptacle 23 can be connected to the lift drive device 21, in particular to the column guide 24. Opposite the interface 35, a receptacle 36 is provided for inserting the indenter 14. This indenter 14 is interchangeably arranged in the receptacle 36.

The indenter receptacle 23 is formed between the interface 35 and the receptacle 36 by a solid body arrangement 37. This solid body joint arrangement 37 comprises at least a first solid body joint 41. The first solid body joint 41 preferably consists of a closed frame 42. The frame 42 is rectangular when viewed in cross-section (FIG. 5). Seen in a plan view (FIG. 6), the frame has, for example, a trapezoidal contour. The frame 42 comprises a rear end face 43, at which the interface 35 is provided. Opposite, the frame 42 comprises a front end face 44, which is associated with the receptacle 36 for the indenter 14. An upper and lower leg extends between the front and rear end faces 43, 44. Adjacent to the rear end face 43 and the front end face 44 in each case, the leg 45 has a joint 46. This joint 46 is formed by a cross-sectional tapering of the thickness of the leg 45. In the first embodiment, it is provided that this cross-sectional tapering for forming the joint 46 extends over the entire width of the leg 45.

Preferably, the first solid body joint 41 is formed in one piece, i.e. from a monoblock. This first solid body joint 41 can be manufactured by milling. The first solid body joint 41 is fixedly connected to the lift drive device 31 by the rear end face 43. As a result, the front end face 44 can be deflected along the Z-axis relative to the rear end face 43.

Due to the geometry, in particular the thickness, of the remaining webs of the joint 46 and/or the material used for the frame 42, the first solid body joint 41 can be designed to transmit a defined force to the indenter 14 in the Z-direction for a predefined traversing distance along the Z-axis. By way of example, a traversing movement of 1 mm along the Z-axis can generate a force of, for example, 30, 50, 100 or 200 N on an indenter 14 resting on the surface of the test specimen 12. This results in a defined size for the penetration movement of the indenter 14 into the test specimen 12. This enables a first measurement value to be recorded. In this embodiment, the lifting drive device 21 can thus form a first measuring device 47 for a traversing movement of the indenter 14 along the Z-axis.

The solid body joint arrangement 37 comprises at least one further solid body joint 51. Preferably, a second solid body joint 51 and a third solid body joint 61 are provided. These solid body joints 41, 51, 61 are directly connected in series and directly connected to one another.

The second solid body joint 51 is preferably flexible along the Y-axis and mechanically rigid in the two further spatial directions, i.e. in the X-axis and the Z-axis. The second solid body joint 51 is provided on a projection 52. The projection 52 is fixed directly to the front end face 44 of the first solid body joint 41. The second solid body joint 51 is preferably fixed to an underside of the projection 52 or to a web or other support.

The second solid body joint 51 consists of a web 53, which can have tapers on both sides, which are preferably formed as mirror images on the web 53. These tapers are preferably semi-circular. In the present exemplary embodiment, it is provided that the web 53 is formed in two parts, wherein a recess can be provided in the central region of the web 53.

A connecting element 56, preferably a connecting plate, is provided between the second solid body joint 51 and the third solid body joint 61, into which the web 53 of the second solid body element 51 directly merges. Advantageously, a web 53 of the third solid body joint 61 extends downwards from this connecting element 56 as seen in the Z-axis. This web 53 is formed analogously to the web 53, such that full reference can be made to this description.

The third solid body joint 61 is flexible along the X-axis and mechanically rigid in the two further spatial directions along the Y-axis and the Z-axis. The web 53 of the third solid body joint 61 is arranged rotated by 90° with respect to the web 53 of the second solid body joint 51.

The receptacle 36, into which the indenter 14 can be inserted, is provided at the lower end of the third solid body joint 61.

The solid body arrangement 37 having the first solid body joint 41, the second solid body joint 51 and the third solid body joint 61 is preferably formed in one piece. Alternatively, it can be provided that an interface is provided between the first and the second solid body joints 41, 51 and/or between the second and the third solid body joints 51, 61.

Sensors 49 can be attached to a holder within the measuring head housing 29, which are assigned to the projection 52. These sensors 49 can also detect a traversing movement or a deflection of the first solid body joint 41 along the Z-axis.

These measurement signals of the sensors 49 and those of the lifting drive device 21 can each be used individually or together for evaluation.

A second measuring device 57 is assigned to the second solid body joint 51 and a third measuring device 67 to the third solid body joint 61. By way of example, the second and third measuring devices 57, 67 can be positioned on the upper leg 45 or the front end face 44. In this way, sensors 58, 68 of the second measuring device 57 and third measuring device 67 are received decoupled from the Z-axis, i.e. when the first solid body joint 41 is deflected along the Z-axis, they are also moved, such that the measurement signals are neutralised by this traversing movement. A sensor receptacle 72 is preferably provided on the upper leg 45, through which the sensor 58 is received in alignment along the Y-axis and the sensor 68 is received in alignment along the X-axis. The receptacle 36 has a reference surface 23, which is assigned to the sensor 58 and sensor 68, such that a change in distance between the reference surface 73 and the sensors 58, 68 can be detected independently of each other. An open, partially closed or closed support frame 75 is in turn provided on the receptacle 36, which accommodates the reference surface 73. This reference surface 73 is preferably provided opposite the indenter 14 on the receptacle 36. When using distance sensors or proximity switches, corresponding components can be provided on the reference surface 73, such that the sensors 58, 68 can detect a change in distance.

A through hole 77 is provided in the projection 52. This through hole aligns with a further hole 78 in the projection 52. This hole 77 is larger in its periphery than the hole in the receptacle 36 for inserting the indenter 14. In this way, the indenter 14 is able to move around in the periphery of a possible deflection of the first and second solid body joints 51, 61. Furthermore, a fixation of the indenter 14 by means of a tool in the receptacle 36 can be made possible via the through hole 77.

The recesses of the webs 53 at their respective intersections of the second and third solid body joints 51, 61 can allow the indenter 14 to pass through for a space-saving arrangement. At the same time, it is possible for a longitudinal axis of the indenter 14 to be located at the intersection of the respective pivot axes of the first and second solid body joints 51, 61. This allows geometrically defined ratios for precise measurement.

FIG. 7 depicts an alternative embodiment of the indenter receptacle 23 to FIG. 2. This alternative differs from the embodiment according to FIG. 2 with regard to the arrangement and positioning of the first, second and third measuring devices 47, 57, 67 as well as in the design of the support frame or support structure 75. In other respects, full reference can be made to the described embodiment and alternatives of the indenter 23 according to FIG. 2 as well as their further depictions.

In this embodiment according to FIG. 7, the support structure 75 is only formed by a web, arm or similar on the receptacle 36. The sensor 49 is attached to a holder inside the measuring head housing 29 and is assigned to a reference surface 73 on the support structure 75. The sensors 58, 68 for lateral measurement are attached to a holder device on the front end face 44 of the indenter receptacle 23. The reference surface 73 can be formed, for example, by a ferrite disc which is arranged on the support structure 75 or is flush-mounted. Alternatively, the sensors 49, 58, 68 may be attached to a separate holder within the measuring head housing.

FIG. 8 depicts a schematic sectional view of the receptacle 36 having an indenter 14 inserted therein. This indenter 14 is inserted into the bore 78 from below. A fastening element 79, in particular a tie rod, is inserted from an opposite side, by means of which the indenter 14 is held fixed in a working position in the receptacle 36. At least one contour is provided in each of the receptacle 36 and the indenter 14 for a positive-locking connection and alignment. During insertion and fixation of the indenter 14 in the receptacle 36, these contours positively engage with each other such that the indenter 14 is positioned in a preferred orientation in the recess 36. Preferably, at least one flattening 81 (see FIG. 4), at least one groove or similar is provided on the indenter 14, in particular on an outer side 80, such that the indenter 14 is only arranged in a defined orientation in the receptacle 36. Preferably, two opposite flattenings 81 can be provided on the indenter 14 such that it can also be arranged offset by 180°. This makes it possible to also use the second hard side of the tip geometry of the indenter. Also, the outer side 80 or the outer periphery of the indenter 14 can have a rectangular or other shape. The alignment of the indenter 14 with a diamond tip is important, for example, for a scratch test or for testing the adhesion of coating, since the diamond tip has a hard side and a soft side at its tip. To perform such tests, it is necessary for the hard side of the tip to be oriented in the direction of the scratch. In the preferred embodiment, this is in the Y-direction.

FIG. 9 depicts a perspective view of an alternative embodiment of the indenter receptacle 23. In this alternative embodiment of the indenter arrangement 23, at least a first solid body joint 41 and a second or third solid body joint 51, 61, preferably all three solid body joints 41, 51, 61 are integrated into each other. The solid body joint arrangement 37 in this embodiment consists of a closed frame 42 which has front and rear end faces 43, 44. These end faces 43, 44 are spaced apart from each other by legs 45, which are preferably aligned in parallel to each other. Seen in plan view, the legs 45 preferably have a trapezoidal contour. This contour can also be rectangular. Joints 46 are provided in the transition region between the respective ends of the legs 45 to the front end face 44 and rear end face 43. In deviation from the embodiment of the frame 42 of the first solid body joint 41 according to FIGS. 2 to 6, it is provided that at least two joints 46 are provided for each transition between the leg 45 to the front end face 44 or rear end face 43. A recess 84 is formed between the two joints 46.

This means that each leg 45 is connected to the rear end face 43 and to the front end face 44 via four joints 46. Three or more joints 46 can also be provided adjacent to one another with recesses 84 arranged in between.

Directly applied sensors 81 are provided on the outer side of the legs 45. These sensors 81 can be designed as strain gauge elements or piezo elements. Such sensors 81 can be produced by printing and/or coating.

Furthermore, it is preferably provided that a connection point 83 is formed in the region of the rear end face 43, along which all contacts for the sensors 81 are provided, such that a simple connection of the indenter receptacle 23 and contacting to the lifting drive device 21 or to the measuring device 11 is made possible. The electric cables and/or sensors 81 on the first solid body joint 41 can be glued or directly applied thereto.

By means of the recess 84 in the legs 45, whereby each leg 45 is integrally connected to, for example, two joints 46 each to the front end face 44 and to the rear end face 43, it is made possible for these sensors 81 associated with the joints 46 to detect deflections of the indenter 14 both in the Z-direction and in the X- and Y-directions.

In FIG. 10, an alternative embodiment of the indenter receptacle 23 to FIG. 9 is provided. In this embodiment, it is provided that the joints 46 are formed as separate joint elements 85, which connect the legs 45 to the front end face 44 and the rear end face 43 by means of detachable fastening elements 88. Preferably, at least one directly applied sensor 81 is provided on the outer side of the joint elements 85. These directly applied sensors 81 can be connected via electric cables not depicted in more detail to a cable connector or connector block not depicted in more detail, which is preferably in turn provided in the region of the rear end face 43. The mode of operation for the indenter receptacle 23 in FIG. 10 corresponds to that in FIG. 9.

List of reference numbers:

11. Measuring device
12. Test specimen
13.
14. Indenter
15.
16. Optical device
17. Base
18. Measuring table
19. Stand
20.
21. Lifting drive device
22.
23. Indenter receptacle
24. Column guide
25. Spindle drive
26. Motor
27. Spindle
28.
29. Measuring head housing
30.
31. Data processing device
34.
35. Interface
36. Recording receptacle
37. Solid body arrangement
38.
39.
41. First solid body joint
42. Frame
43. Rear end face
44. Front end face
45. Leg
46. Joint
47. First measuring device
48.
49. Sensor
50.
51. Second solid body joint
52. Projection
53. Web
54.
55.
56. Connecting element
57. Second measuring device
58. Sensor
59.
60.
61. Third solid body joint
64.
65.
66.
67. Third measuring device
68. Sensor
69.
71.
72. Sensor receptacle
73. Reference surface
74.
75. Support structure
76.
77. Trough hole
78. Hole
79. Fastening element
80. Side
81. Flattenings
82.
83. Connection point
84. Recess
85. Joint element
86.
87.
88. Detachable fastening elements
89.
90.
91.
94.
95.
96.
97.

List of reference numbers:

98.
99.

The invention claimed is:

1. An indenter receptacle for a measuring device, comprising:
   a receptacle for detachably fastening an indenter,
   an interface for mounting on the measuring device, and
   a solid body joint arrangement, which has at least two solid body joints between the interface and the receptacle and which are aligned offset by 90° to each other with respect to their flexibility in only one spatial direction, wherein the solid body joint arrangement of the indenter receptacle comprises the at least two solid body joints formed in one piece.

2. The indenter receptacle according to claim 1, wherein a first solid body joint of the at least two solid body joints is flexible along a vertical axis, in particular the Z-axis, and is mechanically rigid in the two further spatial directions according to the X- and Y-axes, and a second solid body joint of the at least two solid body joints is mechanically rigid in the Z-axis and is mechanically flexible in the X- or Y-axis.

3. The indenter receptacle according to claim 2, wherein a third solid body joint of the at least two solid body joints is provided between the second solid body joint and the receptacle, and the third solid body joint is mechanically rigid in the Z-axis and flexible in the X- or Y-axis, in which the second solid body joint is formed to be mechanically rigid.

4. The indenter receptacle according claim 3, wherein the first solid body joint is flexible in the Z-axis and mechanically rigid in the X- and Y-axes, the second solid body joint is flexible in the Y-axis and mechanically rigid in the X- and Z-axes, and the third solid body joint is mechanically flexible in the X-axis and mechanically rigid in the Y- and Z-axes.

5. The indenter receptacle according to claim 3, wherein the second and third solid body joints formed by two webs offset by 90° to each other, which are arranged mirror-inverted to each other.

6. The indenter receptacle according to claim 5, wherein a longitudinal axis of the receptacle for the indenter lies in the intersection between the second and third solid body joints.

7. The indenter receptacle according to claim 6, wherein the second and third solid body joints, which are arranged on top of one another as seen in the Z-axis, have a bore at the intersection, which bore is aligned with the receptacle.

8. The indenter receptacle according to claim 1, wherein a first solid body joint of the at least two solid body joints has a peripheral frame which comprises a front and rear end face between which two legs, which are spaced apart from each other and run in parallel, extend, wherein each leg is connected with at least one joint to the front and rear end face.

9. The indenter receptacle according to claim 8, wherein a cross-sectional reduction is provided on the inner side and/or the outer side of each leg or both to form the joint.

10. The indenter receptacle according to claim 8, wherein the front end face is aligned in parallel to the rear end face and, due to the design of the frame, a parallelogram guide is formed for a traversing movement of the front end face along the Z-axis.

11. The indenter receptacle according to claim 8, wherein at least an outer or inner side of the leg of the frame is formed to be flat, or the legs have a rectangular or trapezoidal contour when seen in the plan view.

12. The indenter receptacle according to claim 8, wherein the receptacle for the indenter is arranged on the front end face of the first solid body joint with the interposition of at least one further solid body joint.

13. The indenter receptacle according to claim 8, wherein a projection or retaining webs or protrusions are provided on a front end face of the first solid body joint, on the underside of which a second solid body joint of the at least two solid body joints is arranged.

14. The indenter receptacle according to claim 1, wherein the solid body arrangement comprises a first measuring device which is provided on an outer side of the front end face of the frame.

15. The indenter receptacle according to claim 14, wherein two or more sensors of the first measuring device, which are aligned at an angle to each other, are positioned relative to the projection.

16. The indenter receptacle according to claim 1, wherein an open, partially open or closed support frame or a support structure is provided on the receptacle of the indenter, on which support frame or support structure a reference surface is provided, which is arranged opposite the indenter as viewed along the Z axis and which is associated with a sensor of a second measuring device or a sensor of a third measuring device or both.

17. The indenter receptacle according to claim 1, wherein a first solid body joint of the at least two solid body joints and at least one further solid body joint of the at least two solid body joints are integrated in a common frame, which comprises a rear end face and a front end face as well as legs arranged at a distance from each other and preferably in parallel to each other, wherein each leg is connected by at least two joints to the front end face and at least two joints to the rear end face, and preferably at least one recess is provided between the joints which lie between the leg and the rear end face or between the leg and the front end face.

18. The indenter receptacle according to claim 17, wherein the joints are formed as separate joint elements, which are connectable by detachable fastening elements to the leg on one side and to the front end face or rear end face on the other side.

19. The indenter receptacle according to claim 17, wherein at least one directly applicable sensor is provided on an outer side of the at least one joint.

20. A measuring device for detecting measurement signals during a penetration movement of an indenter into a surface of a test specimen or into a coating on the test body, having a measuring table on which the test specimen can be positioned, having a lifting drive device by means of which a traversing movement of the indenter along a Z-axis is controllable, and having at least one first measuring device for detecting a traversing movement of the indenter along a traversing axis in the Z-direction, wherein the indenter receptacle according to claim 1 is provided for receiving the indenter.

21. The measuring device according to claim 20, wherein the indenter receptacle is surrounded by a measuring head housing which is removable.

* * * * *